United States Patent
Wendte et al.

(10) Patent No.: US 6,272,819 B1
(45) Date of Patent: Aug. 14, 2001

(54) SUGAR CANE YIELD MONITOR

(75) Inventors: Keith W. Wendte, Lemont; Andrey Skotnikov, Burr Ridge; Kurian K. Thomas, Oak Park, all of IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/193,268

(22) Filed: Nov. 17, 1998

(51) Int. Cl.$^7$ ...................................................... A01D 69/03
(52) U.S. Cl. ............................. 56/11.9; 460/6; 56/10.2 E
(58) Field of Search .......................... 460/6; 56/10.2 C, 56/10.2 E, 10.2 R, 10.5, 53, 60, 61, 63, 500, 11.9; 73/861.73, 12.06, 12.09, 12.11, 12.13, 12.14

(56) References Cited

U.S. PATENT DOCUMENTS

| | | |
|---|---|---|
| 3,515,144 * | 6/1970 | Morrison .................................. 460/4 |
| 4,019,308 | 4/1977 | Quick . |
| 4,098,060 | 7/1978 | Quick . |
| 4,194,344 | 3/1980 | Mizzi . |
| 4,295,325 | 10/1981 | Cannavan . |
| 4,343,140 | 8/1982 | Hegger . |
| 4,354,622 * | 10/1982 | Wood ................................ 73/861.73 |
| 4,408,441 | 10/1983 | Willett . |
| 4,440,029 * | 4/1984 | Tomiyasu et al. ................ 73/861.73 |
| 4,441,513 * | 4/1984 | Herwig ..................................... 460/4 |
| 4,517,792 * | 5/1985 | Denning et al. ................... 56/10.2 C |
| 4,540,003 * | 9/1985 | Osselaere ................................ 130/27 |
| 4,593,555 * | 6/1986 | Krutz et al. ............................. 73/116 |
| 4,677,813 | 7/1987 | Stiff et al. . |
| 5,138,819 | 8/1992 | André . |
| 5,191,759 | 3/1993 | Baker . |
| 5,282,389 * | 2/1994 | Faivre et al. ...................... 73/861.73 |
| 5,335,554 * | 8/1994 | Kempf et al. ..................... 73/861.73 |
| 5,779,541 * | 7/1998 | Helfrich ................................... 460/6 |
| 5,800,262 * | 9/1998 | Andersen et al. ....................... 460/6 |
| 6,121,782 * | 9/2000 | Adams et al. ......................... 324/689 |

OTHER PUBLICATIONS

Messtechnik, Hottinger Baldwin. Easy fit torque sensor fits between flanges. *Design Engineering*, (Jul./Aug. 1995) 2 pages.

* cited by examiner

Primary Examiner—Thomas B. Will
Assistant Examiner—Meredith Petravick
(74) Attorney, Agent, or Firm—Foley & Lardner

(57) ABSTRACT

A yield monitor system for determining quantity of harvested sugar cane on a sugar cane harvesting vehicle is disclosed. The vehicle has a harvesting mechanism including a base cutter assembly for severing sugar cane from a field, a chopper assembly for chopping the severed sugar cane into billets, and an elevating assembly for elevating the billets during transport to a storage device, the elevating assembly having an elevator motor coupled to a pressurized hydraulic fluid source. The yield monitor system includes a sensing assembly and a control monitor. The sensing assembly generates a sensed signal representative of a quantity of harvested sugar cane being transported to the storage device. The control monitor receives the sensed signal and determines the quantity of harvested sugar cane therefrom. The sensing assembly includes an elevator pressure sensor coupled to the elevator motor for generating the sensed signal in response to the hydraulic pressure applied to the elevator motor, an elevator driveshaft torque sensor, or a deflection plate sensor impacted by the harvested billets. The system includes a positioning system, and is capable of generating site-specific sugar cane yield maps. The system can also detect areas of the field where no sugar cane is growing based upon pressure signals from a base cutter pressure sensor.

11 Claims, 4 Drawing Sheets

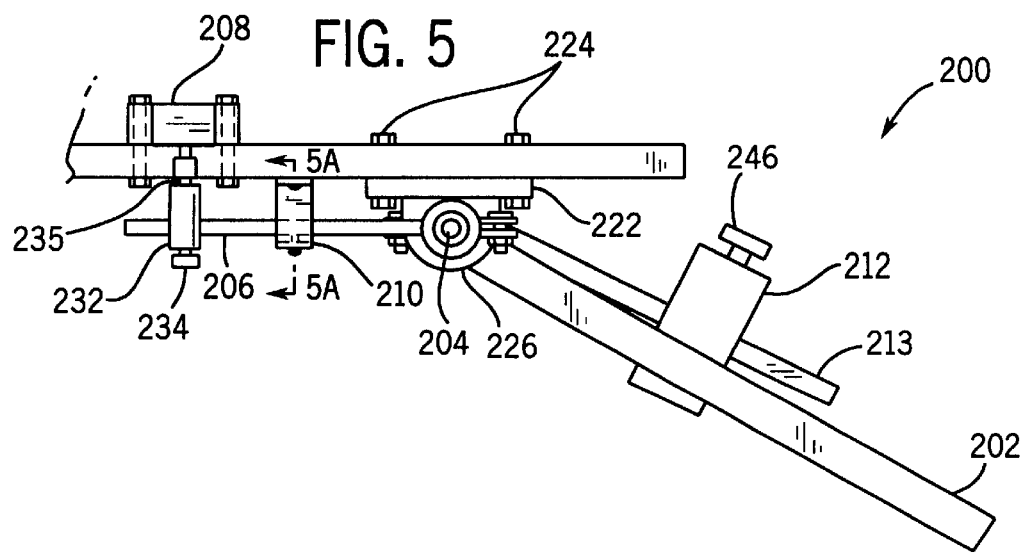
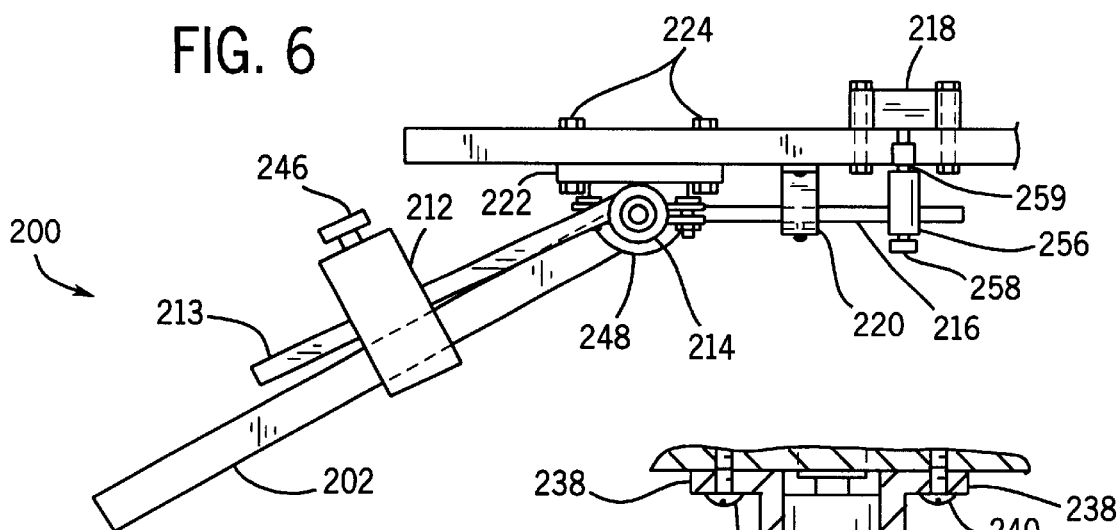
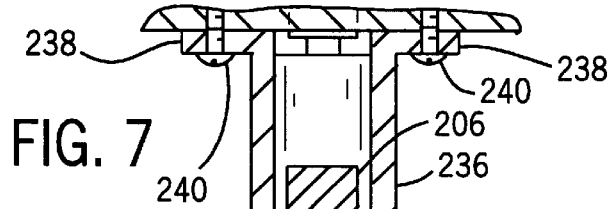
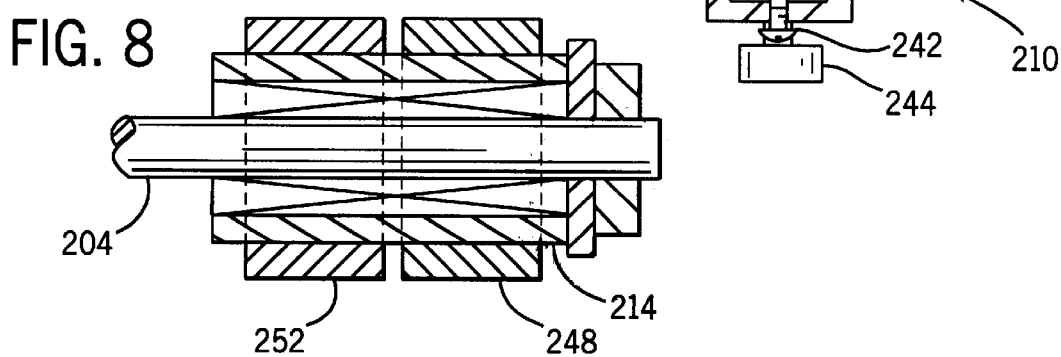

SUGAR CANE YIELD MONITOR

FIELD OF THE INVENTION

The invention relates generally to the field of agricultural harvesting equipment. More particularly, the invention relates to a crop yield monitor for determining the quantity of crop harvested by an agricultural harvesting vehicle.

BACKGROUND OF THE INVENTION

Research within the agricultural community has shown that management of crop production may be optimized by taking into account spatial variations that often exist within a given farming field. For example, by varying the farming inputs being applied to a field according to local conditions within the field, a farmer can optimize crop yield as a function of the inputs applied while preventing or minimizing environmental damage. This management technique has become known as precision, site-specific, prescription or spatially-variable farming.

The management of a field using precision farming techniques requires the gathering and processing of data relating to site-specific characteristics of the field. Generally, site-specific input data is analyzed in real-time or off-line to generate a prescription map including desired application rates of a farming input. A control system reads data from the prescription map and generates a control signal which is applied to a variable-rate controller adapted to apply a farming input to the field at a rate that varies as a function of the location. Variable-rate controllers may be mounted on or trailed by agricultural vehicles with attached variable-rate applicators, and may be used to control application rates for applying seed, fertilizer, insecticide, herbicide or other farming inputs. The effect of the inputs may be analyzed by gathering site-specific yield and moisture content data and correlating this data with the farming inputs, thereby allowing a user to optimize the amounts and combinations of farming inputs applied to the field.

The spatially-variable characteristic data may be obtained or measured by manual measuring, remote sensing, or sensing during field operations. Manual measurement typically involve taking a soil probe and analyzing the soil in a laboratory to determine nutrient data or soil condition data such as soil type or soil classification. Taking manual measurements, however, is labor intensive and, due to high sampling costs, provides only a limited number of data samples. Remote sensing may include taking aerial photographs or generating spectral images or maps from airborne or spaceborne multispectral sensors. Spectral data from remote sensing, however, is often difficult to correlate or register with a precise position in a field or with a specific quantifiable characteristic of the field. Both manual measurements and remote sensing require a user to conduct an airborne or ground-based survey of the field apart from normal field operations.

Spatially-variable characteristic data may also be acquired during normal field operations using appropriate sensors supported by a combine, tractor or other vehicle. A variety of characteristics may be sensed including soil properties (e.g., organic matter, fertility, nutrients, moisture content, compaction and topography or altitude), crop properties (e.g., height, moisture content or yield), and farming inputs applied to the field (e.g., fertilizers, herbicides, insecticides, seeds, cultural practices or tillage techniques used). Other spatially-variable characteristics may be manually sensed as a field is traversed (e.g., insect or weed infestation or landmarks). As these examples show, characteristics which correlate to a specific location include data related to local conditions of the field, farming inputs applied to the field, and crops harvested from the field.

Obtaining characteristic data during normal field operations is advantageous over manual measuring and remote sensing in that less labor is required, more data samples may be taken, samples may be easier to correlate with specific positions and separate field scouting trips are not required.

One important type of data which must be gathered in a site-specific farming system includes site-specific quantity or yield data for the crop that is being harvested. Once gathered, the site-specific yield data is correlated with site-specific data for the farming inputs which were used to produce that crop. The results of this analysis provide information which can then be used to improve the farming operation. Existing crop yield monitors are configured to measure the quantity or yield of bulk crops such as grains. These existing crop yield monitors receive grain flow signals generated by grain flow sensors located within the clean grain path of the harvesting vehicle (i.e., a combine). Existing crop yield monitors, however, have not heretofore been available for monitoring the quantity or yield of non-grain or non-bulk crops harvested by suitable harvesting vehicles. For example, there is currently no crop yield monitor suitable for measuring the quantity or yield of sugar cane billets harvested by a sugar cane harvester, or for measuring the yield of other non-grain or non-bulk crops such as potatoes, sugar beets, and other vegetables.

Thus, there is a need for a crop yield monitor which can accurately determine the quantity or yield of non-grain or non-bulk crops harvested by suitable harvesting vehicles. There is also a need for such a non-grain or non-bulk crop yield monitor which can gather site-specific quantity or yield data for use in a site-specific farming system. There is a particular need for a sugar cane yield monitor for use in monitoring the quantity or yield of sugar cane billets harvested by a sugar cane harvester. Other non-grain or non-bulk crops which could be monitored by such a crop yield monitor include potatoes, sugar beets, and other vegetables.

SUMMARY OF THE INVENTION

One embodiment of the invention relates to a yield monitor system for determining quantity of harvested sugar cane on a sugar cane harvesting vehicle. The vehicle has a harvesting mechanism including a base cutter assembly for severing sugar cane from an agricultural field, a chopper assembly for chopping the severed sugar cane into billets, and an elevating assembly for elevating the sugar cane billets during transport to a storage device. The elevating assembly includes an elevator motor hydraulically coupled to a source of pressurized hydraulic fluid. The yield monitor system includes a sensing assembly and a control monitor. The sensing assembly is coupled to the elevating assembly for generating a sensed signal representative of a quantity of harvested sugar cane being transported to the storage device. The control monitor, coupled to the sensing assembly, receives the sensed signal and determines the quantity of harvested sugar cane therefrom.

Another embodiment of the invention relates to a yield monitor system for determining quantity of harvested crop on a harvesting vehicle. The vehicle has a harvesting mechanism including a cutting assembly for severing crop from an agricultural field and an elevating assembly for elevating the severed crop during transport to a storage device. The elevating assembly includes an elevator and an elevator motor to drive the elevator. The motor is hydraulically coupled to a pressurized hydraulic fluid source. The yield monitor system includes a sensor and a control monitor. The sensor generates signals representative of loads placed on the motor by only the elevator when no severed crop is being elevated, and by both the elevator and the severed crop when the severed crop is being elevated. The control monitor, coupled to the sensor, determines a difference between the signals generated when no severed crop is being elevated and the signals generated when the severed crop is being elevated. The control monitor also determines the quantity of harvested crop based upon the difference between the signals.

Another embodiment of the invention relates to a yield monitor system for determining quantity of harvested crop on a harvesting vehicle. The vehicle has a harvesting mechanism including a cutting assembly for severing non-bulk crop such as sugar cane from an agricultural field and a conveyor for conveying the severed crop to a storage device. The yield monitor system includes a deflection plate sensor and a control monitor. The deflection plate sensor includes a deflection plate and a load sensor coupled thereto. The deflection plate is located proximate to the conveyor such that the severed non-bulk crop impinges on the deflection plate to exert a force on the deflection plate. The load sensor generates a load signal in response to the force exerted on the deflection plate. The control monitor, coupled to the deflection plate sensor, receives the load signal from the load sensor and determines the quantity of harvested non-bulk crop therefrom.

BRIEF DESCRIPTION OF THE DRAWINGS

The invention will become more fully understood from the following detailed description, taken in conjunction with the accompanying drawings, wherein like reference numerals refer to like parts, in which:

FIG. 5 is a side view of the deflection plate sensor shown in FIG. 4;

FIG. 6 is an opposite side view, from that shown in FIG. 5, of the deflection plate sensor shown in FIG. 4;

FIG. 7 is a side cut-out view of a pre-load assembly including an adjustable support screw used in the deflection plate sensor shown in FIG. 3; and FIG. 8 is a side cut-out view of rotatable levers at their pivot point, which is at the shaft of the deflection plate sensor shown in FIG. 4.

DETAILED DESCRIPTION OF THE PREFERRED EMBODIMENTS

Figure 1:
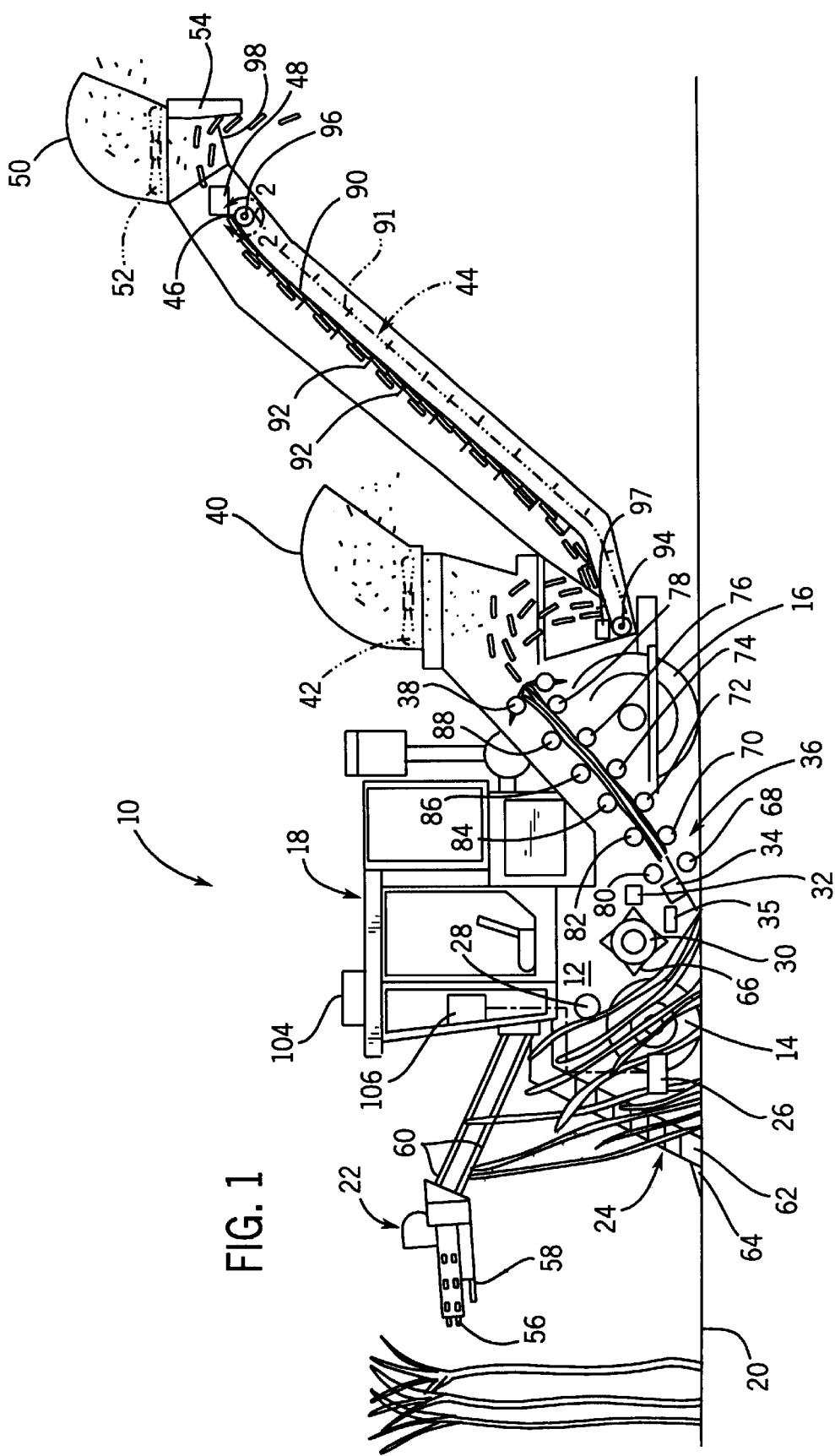
FIG. 1 is a cut-out side view of a sugar cane harvesting vehicle equipped with a sugar cane yield monitor system according to a first embodiment of the present invention.

Referring to FIG. 1, a sugar cane harvesting vehicle 10 includes a frame 12, a pair of front wheels 14, a pair of rear wheels 16, and an operator's cab 18. Vehicle 10 also includes a primary source of power (i.e., an engine mounted on frame 12) which powers wheels 14 and/or 16 via a transmission (not shown). The engine also powers a hydraulic fluid pump (not shown) used for generating the pressurized hydraulic fluid used to power various other components of vehicle 10.

Vehicle 10 includes components for cutting, processing, cleaning, and discharging sugar cane as the cane is harvested from an agricultural field 20. The processing path for the harvested sugar cane include a variety of components including a topper assembly 22, a crop divider 24, a knock-down roller 28, a fin roller 30, a base cutter assembly 34, a plurality of feed rollers 36, a chopper assembly 38, a primary extractor 40, a primary extractor fan 42, an elevator assembly 44, an elevator motor 46, an elevator pressure sensor 48, a secondary extractor 50, a secondary extractor fan 52, and a deflector 54.

Topper assembly 22, located in front of vehicle 10 to intercept sugar cane as vehicle 10 is propelled forwardly, includes a gathering disk 56 and a cutting disk 58. Gathering disk 56 and cutting disk 58 are both hydraulically driven by the vehicle's hydraulic circuit, and are fully reversible. The height of topper assembly 22 is adjustable by a pair of arms 60 hydraulically raised and lowered as desired by the operator. Topper assembly 22 cuts the tops off of the sugar cane stalks.

Crop divider 24 extends upwardly and rearwardly from field 20 and includes two spiral feed rollers 62. Each feed roller 62 includes a ground shoe 64 at its lower portion. Crop divider 24 gathers the sugar cane stalks for harvesting.

Knock down roller 28 is a rotatable roller mounted to vehicle 10 near front wheels 14. As roller 28 rotates, the sugar cane stalks being harvested are knocked down while crop divider 24 gathers the stalks from agricultural field 20.

Fin roller 30 is a rotatable knock down roller mounted to vehicle 10 behind knock down roller 28. Fin roller 30 includes intermittently mounted fins 66. As fin roller 30 rotates during the harvest, the sugar cane stalks that have been knocked down by knock down roller 28 are separated and knocked down further.

Base cutter assembly 34 is mounted to vehicle 10 behind fin roller 30 and includes blades for severing the sugar cane stalks as the sugar cane is harvested. The blades, located on the periphery of assembly 34, are rotated by a hydraulic motor (not shown) powered by the vehicle hydraulic system. The blades are angled down to sever the base of the cane as the cane is knocked down by fin roller 30. The pressure of the hydraulic fluid applied to the hydraulic motor to rotate assembly 34 is sensed by a base cutter pressure sensor 35. The sensed pressure signals can be used to determine areas of field 20 where sugar cane is not growing based upon a comparison of the sensed pressure signals with a predetermined value.

Feed rollers 36 are rotatable rollers for moving the severed stalks of sugar cane from base cutter assembly 34 along the processing path. Feed rollers 36 include bottom rollers 68, 70, 72, 74, 76 and 78 and generally opposed top pinch rollers 80, 82, 84, 86 and 88. Bottom rollers 68–78 and top rollers 80–88 pinch the harvested sugar cane during transport. Each roller 68–88 is hydraulically powered. Debris (e.g., rocks, dirt) is allowed to fall through bottom rollers 68–78 to field 20.

Chopper assembly 38 are located proximate feed rollers 78 and 88, and are used for cutting or chopping the severed sugar cane stalks into pieces or "billets" which may be, for example, six (6) inches long. Cutting the stalks into billets makes it easier to subsequently store and process the cane. The billets are propelled to a lower end of elevator assembly 44 for delivery to a storage device.

Pieces of debris (e.g., dust, dirt, leaves, etc.) separated from the sugar cane billets are expelled from vehicle 10 through primary extractor 40, which is located behind chopper assembly 38 and is oriented to direct the debris outwardly behind vehicle 10. Mounted at the base of primary extractor 40 is extractor fan 42, which is powered by a hydraulic motor to provide sufficient suction to pick up the debris and force the debris through primary extractor 40. The billets, heavier than the debris being expelled through extractor 40, fall to the lower end of elevator 44.

Elevator assembly 44 comprises a conveyor including an elevator 90, a chain 91, and a plurality of flights 92 attached to and evenly spaced on chain 91. Flights 92, which may include paddles, hold the sugar cane billets on elevator 90 as the billets are elevated. Elevator 90, chain 91 and flights 92 travel in an endless loop about lower and upper sprockets 94 and 96, respectively. Elevator motor 46 is attached to and drives upper sprocket 96, thereby providing power to drive elevator assembly 44. Elevator motor 46 is a hydraulic motor which receives a flow of pressurized hydraulic fluid from the vehicle's hydraulic system.

Elevator pressure sensor 48, hydraulically coupled to motor 46, may include a differential pressure sensor mounted across motor 46 (i.e., across the fluid lines which supply and drain hydraulic fluid to motor 46), or a non-differential pressure sensor mounted in a hydraulic fluid line coupled to motor 46. Elevator pressure sensor 48 generates pressure signals representative of loads placed on motor 46, which depend on both the force required to move the conveyor (which itself depends upon the weight of the conveyor and other factors) and the amount of severed billets being elevated. The speed of the elevator can be sensed by an elevator speed sensor 97, which measures the rotational speed of lower sprocket 94.

Alternatively, elevator motor 46 may be connected to drive lower sprocket 94. Other types of conveyors (e.g., paddle conveyors, or belt conveyors) may be used, and elevator pressure sensor 48 may be replaced by other sensors, such as drive shaft torque sensors, which generate signals indicative of the force needed to move the conveyor.

Pieces of debris (e.g., dust, dirt, leaves, etc.) separated from the elevated sugar cane billets are expelled from vehicle 10 through secondary extractor 50, which is located behind upper sprocket 96 and is oriented to direct the debris outwardly behind vehicle 10. Mounted at the base of secondary extractor 50 is extractor fan 52, which is powered by a hydraulic motor to provide sufficient suction to pick up the debris and force the debris through secondary extractor 50. The billets, heavier than the debris expelled through extractor 50, are propelled by elevator assembly 44 against a deflector 54 located at the top end of the elevator. Deflector 54 is a formed rigid plate for stopping the rearward motion of the billets, and for causing the billets to fall under the force of gravity through a discharge opening 98 into an external storage device (not shown) such as a sugar cane billet cart.

In operation, sugar cane harvesting vehicle 10 proceeds across an agricultural field for sugar cane. After the height of topper assembly 22 is adjusted by arms 60, gathering disk 56 on topper assembly 22 gathers sugar cane stalks as the harvester proceeds across field 20, and cutter disk 58 severs the leafy tops of the sugar cane stalks for disposal on either side of vehicle 10. As the stalks enter crop divider 24, ground shoes 64 set the operating width which determines the quantity of sugar cane entering the throat of vehicle 10. Spiral feed rollers 62 gather the stalks into the throat where knockdown roller 28 bends the stalks in conjunction with the action of fin roller 30. Once the stalks are angled downwardly as shown in FIG. 1, base cutter assembly 34 severs the base of the stalks from field 20. The severed stalks are then, by movement of vehicle 10, directed to feed rollers 36.

The severed sugar cane stalks are conveyed rearwardly by feed and pinch rollers 68–78 and 80–88, respectively, which compress the stalks, make them more uniform, and shake loose debris to pass through bottom rollers 68–78 to field 20. At the rearward top end of feed rollers 36, chopper assembly 38 cuts or chops the compressed sugar cane stalks into pieces or billets (e.g., 6 inch cane sections). Airborne debris or chaff (e.g., dust, dirt, leaves) separated from the sugar cane billets is extracted through primary extractor 40 using suction created by extractor fan 42. The billets fall downwardly to the lower end of elevator assembly 44.

Elevating assembly 44 elevates the harvested sugar cane billets to the top of elevating assembly 44. At the top, the billets are projected by the motion of elevating assembly 44 against deflector 54, which stops the billets and causes the billets to fall under the force of gravity through discharge opening 98 to an external storage device. As with primary extractor 40, chaff is blown out from harvesting vehicle 10 through secondary extractor 50 with the aid of extractor fan 52.

Thus, sugar cane harvesting vehicle 10 shown in FIG. 1 is capable of topping, severing, chopping and cleaning sugar cane as vehicle 10 is driven through a field of sugar cane. The sugar cane stalks are conveniently chopped into pieces or billets for later processing. Preferably, some of the sugar cane processing features of vehicle 10 are similar to those of sugar cane harvesting vehicles made by Austoft Industries Ltd. of Australia, which has been acquired by Case Corp., the assignee of the present application. Features of Austoft sugar cane harvesters are shown in U.S. Pat. Nos. 4,677,813 and 5,191,759, both incorporated herein by reference.

Figure 2:
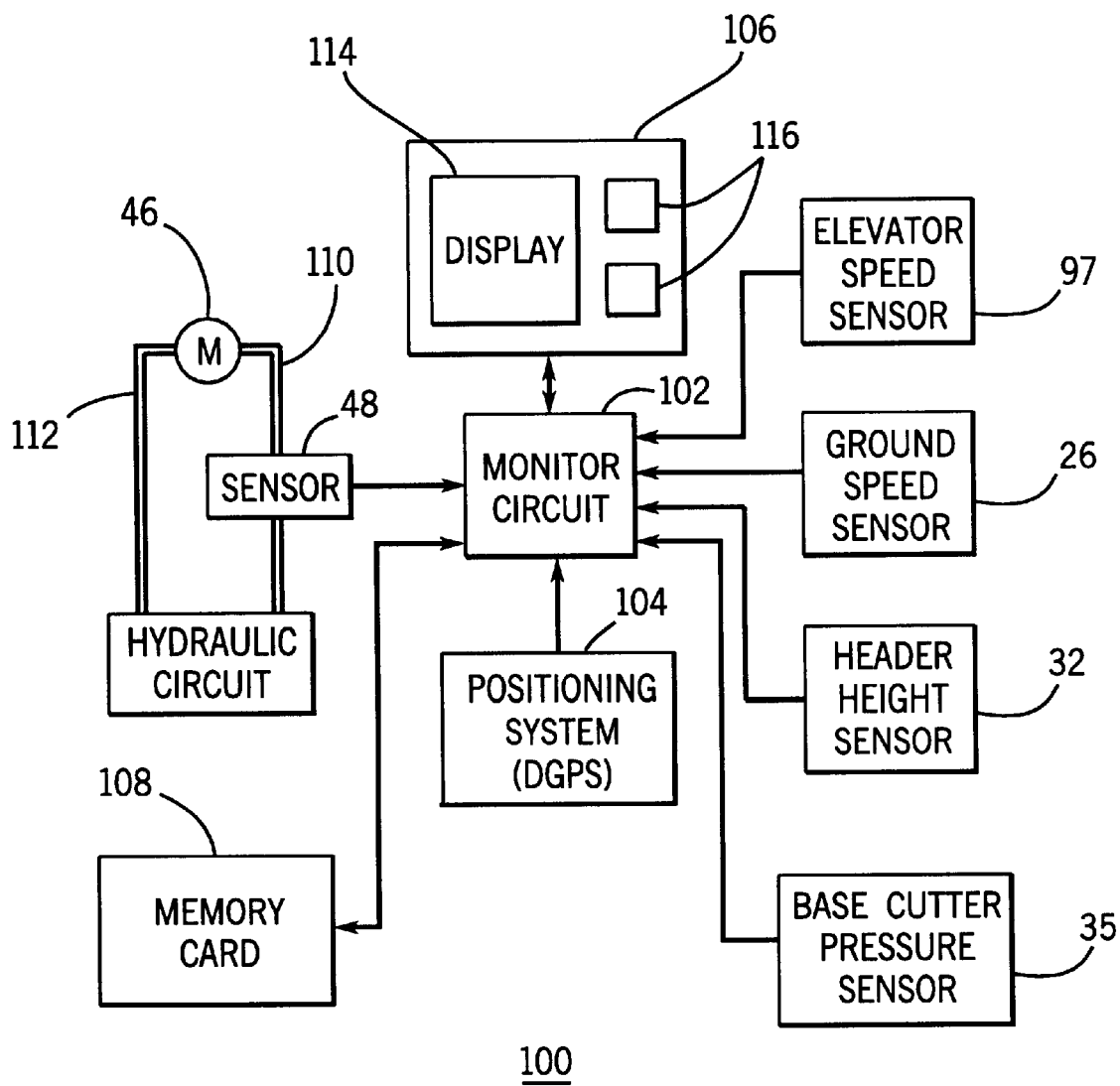
FIG. 2 is a block diagram of the yield monitor system of FIG. 1.
Figure 3:
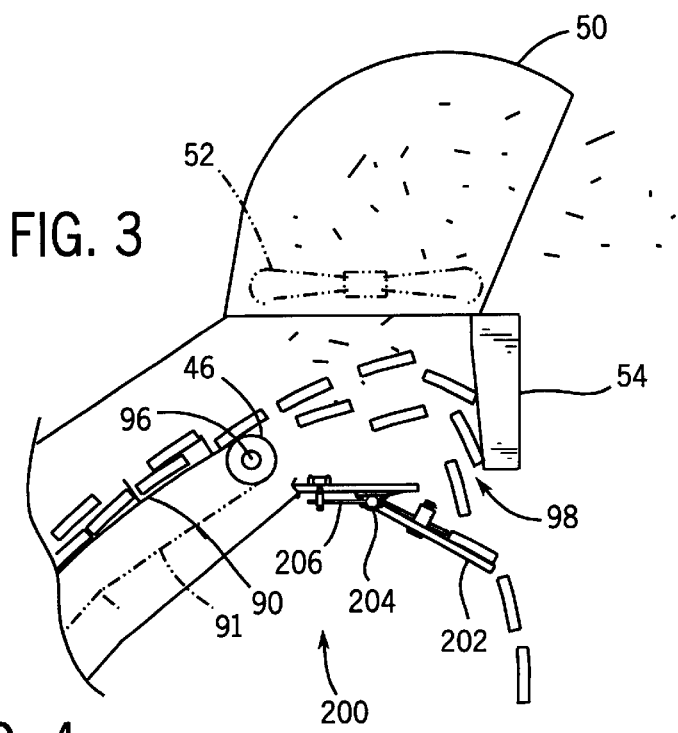
FIG. 3 is an enlarged view of the top portion of the elevator assembly on the sugar cane harvesting vehicle of FIG. 1 equipped with a sugar cane yield monitor system according to a second embodiment of the present invention.
Figure 4:
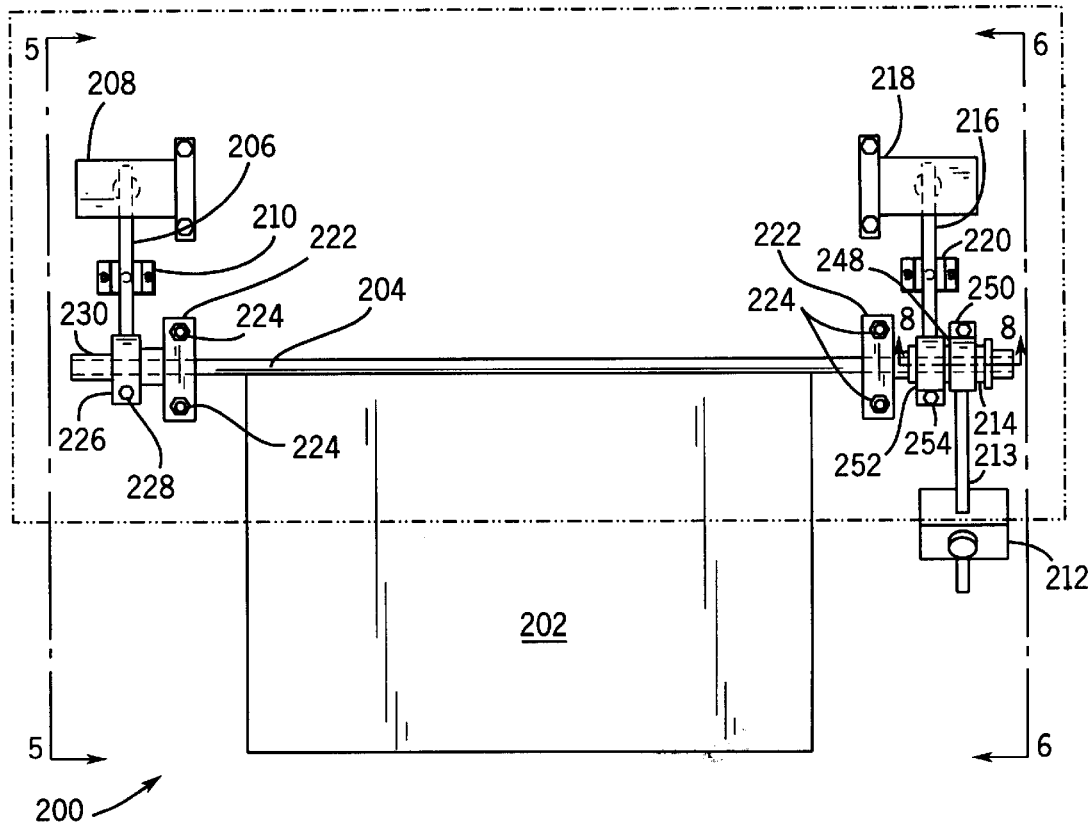
FIG. 4 is a bottom view of a deflection plate sensor used by the sugar cane yield monitor system shown in FIG. 3.

Referring to FIG. 2, sugar cane harvesting vehicle 10 is equipped with a sugar cane yield monitor system 100. System 100 includes a monitor circuit 102, elevator pressure sensor 48, elevator speed sensor 97, ground speed sensor 26, header height sensor 32, base cutter pressure sensor 35, a positioning system 104, an operator interface device 106, and a removable memory card 108.

Monitor circuit 102 includes a processing circuit, input circuits for receiving input signals, output circuits for generating output signals, a read-only memory (ROM) for storing programs executed by the processing circuit, and a random-access memory (RAM) for storing variables. The input circuits receive electrical signals generated by elevator pressure sensor 48, elevator speed sensor 97, ground speed sensor 26, header height sensor 32 and base cutter pressure sensor 35. The input circuits also receive geographic positioning signals from positioning system 104, and operator input data from operator interface device 106. The output circuits apply display signals to interface device 106, and transmit site-specific yield data to be recorded on removable memory card 108. The processing circuit may include a microprocessor or microcontroller which executes a software program stored in the ROM, or may be implemented using dedicated, hard-wired circuitry.

As shown in FIG. 2, elevator pressure sensor 48 is a non-differential pressure sensor mounted in a hydraulic fluid line 110 coupled to elevator motor 46, which drives elevator assembly 44. Elevator pressure sensor 48 generates sensed pressure signals in response to the hydraulic pressure being applied to motor 46 as the harvested sugar cane is being elevated during transport to the storage device. Thus, the sensed pressure signals depend upon the load placed on elevator motor 46. Alternatively, pressure sensor 48 could be a differential pressure sensor placed across the two hydraulic fluid lines 110 and 112 coupled to elevator motor 46. In yet another alternative embodiment, elevator pressure sensor 48 is replaced by an elevator drive shaft torque sensor such as the Torque Flange sensor available from Hottinger Baldwin Messtechnik (HBM). The torque sensor generates sensed signals in response to increased or decreased strain or stress caused by changes in the amount of sugar cane on elevator assembly 44.

Elevator pressure sensor 48 as well as elevator speed sensor 97 may include, for example, a proximity sensor for sensing the speed of rotation of lower sprocket or gear 94 which drives elevator assembly 44. Each pass by a tooth of sprocket 94 may generate a pulsed electrical signal, read by monitor circuit 102 via an appropriate input circuit.

Ground speed sensor 26 generates signals representative of the speed of vehicle 10 relative to field 20. In one embodiment, ground speed sensor includes a radar speed sensor for directly measuring ground speed. Alternatively, ground speed sensor 26 may include an appropriate sensor (e.g., proximity sensor) coupled to an axle or gear of vehicle 10 for sensing the rotation rate of the axle or gear.

Header height sensor 32 is mounted on sugar cane harvesting vehicle 10 proximate to fin roller 30. As shown in FIG. 1, height sensor 32 generates signals representative of the height at which the sugar cane stalks are cut.

Base cutter pressure sensor 35 generates sensed pressure signals in response to the hydraulic pressure being applied to the hydraulic motor (not shown) which rotates base cutter assembly 34. As with elevator pressure sensor 48, base cutter pressure sensor 35 may be a differential or non-differential pressure sensor. The sensed pressure depends upon the load placed on assembly 34 which, in turn, depends on the stalks being cut by assembly 34. Monitor circuit 102 compares the sensed pressure signals with a predetermined value to determine areas of field 20 where sugar cane is not growing.

Positioning system 104 may include, for example, a Differential Global Positioning System (DGPS) system including an antenna (shown in FIG. 1 by reference numeral 104) and a cab-mounted receiver (not shown). System 104 provides monitor circuit 102 with positioning signals or data representative of the geographic location (i.e., the latitude and longitude coordinates) of antenna 104. For improved accuracy, monitor circuit 102 may offset the geographic location data to determine the geographic location at which the cane was severed from field 20.

Operator interface device 106, mounted within cab 18 of vehicle 10, includes a display device 114 and a plurality of input devices 116. Display device 114 provides, inter alia, a visual display of sugar cane yield or quantity data to the operator in response to display signals generated by monitor circuit 102. In one embodiment, display device 114 merely displays alphanumeric data to the operator to allow the operator to monitor, for example, instantaneous sugar cane yield at the current location of vehicle 10. Alternatively, however, the display signals provided to display device 114 include sugar cane yield or quantity data correlated with the geographic locations in field 20 where the sugar cane was harvested, and display device 114 displays a map of the sugar cane yield at various areas within field 20.

Input devices 116 allow the operator to control the operation of sugar cane yield monitor system 100, and display device 114 displays other parameters of system 100 or of other systems, and provides status and fault data to the operator. Other functions requiring operator inputs, such as calibration, also use device 106.

Removable memory card 108 allows site-specific farming data to be output from yield monitor system 100. The site-specific farming data may include a sugar cane yield map including yield data and correlated geographic location data. Memory card 108 may be, for example, a PCMCIA memory card compatible with the farmer's office computer. Alternatively, site-specific farming data may be communicated from system 100 using other input/output interfaces such as a serial interface (e.g., RS-232 or RS-485), infrared transmission links, or a radio link.

Together with controlling the various input and output interfaces described above, monitor circuit 102 is programmed to determine the quantity of harvested sugar cane using the sensed signal from elevator pressure sensor 48. The algorithm for determining the actual yield depends on the principle of conservation of mass. The input to sugar cane harvesting vehicle 10 must equal the output from the vehicle. Mathematically, the yield algorithm is represented by the equation:

$$B * V * Y = Bc * Vc * Yc \qquad (1)$$

Or, solving for the yield Y (e.g., in kg/sec) of the harvested sugar cane:

$$Y = (Bc * Vc * Yc) / (B * V) \qquad (2)$$

wherein Bc is conveyor width (i.e., width of elevator assembly 44, in meters), Vc represents the conveyor velocity (i.e., velocity of elevator assembly 44, in m/sec), Yc represents the conveyor's sugar cane output (i.e., in kg/sec), B is the implement width for cutting the sugar cane (i.e., the width between ground shoes 64, in meters), and V represents the ground velocity of vehicle 10 (i.e., in m/s). Bc and B are constants since each is known. However, Vc, Yc and V are measured.

Conveyor velocity Vc is the speed of elevator assembly 44, and is measured by elevator speed sensor 97. Vehicle ground velocity V is the ground speed of vehicle 10, and is measured by ground speed sensor 26. Conveyor sugar cane output Yc represents the amount or quantity of sugar cane being conveyed by elevator assembly 44. Thus, the value of Yc can be derived as a function of the load placed on elevator motor 46, as measured by elevator pressure sensor 48.

When no harvested sugar cane is being elevated by elevator assembly 44, the load placed on elevator motor 46 is relatively low. However, as more and more harvested sugar cane is elevated by elevator assembly 44, the load placed on motor 46 increases with the amount of sugar cane. Thus, the pressure signals generated by elevator pressure sensor 48 have a minimum value representative of no sugar cane being elevated, with the pressure signals increasing with increasing amounts of sugar cane. The mathematical relationship between the amount of sugar cane being elevated and the pressure signals from sensor 48 can be determined empirically via appropriate testing, with the testing results processed using an appropriate curve fitting algorithm to determine the actual relationship. Monitor circuit 102 is programmed to determine the conveyor sugar cane output Yc using the empirically-determined relationship and the output from pressure sensor 48.

Because the pressure signals generated by pressure sensor 48 depend upon the load placed on elevator motor 46, accuracy of the calculated Yc value may be adversely affected by factors which affect the load placed on motor 46. These factors include the amount and the type of contaminants which collect on elevator assembly 44 during the harvest. For example, sugar cane contains syrup which will stick to elevator assembly 44 and will cause dirt and dust to collect thereon. These contaminants will affect the weight and amount of friction associated with elevator assembly 44, thereby affecting the measured pressure. While it may be possible to wash vehicle 10 to minimize the affect of contaminants, it may be inconvenient or impractical to wash vehicle 10 as often as required, particularly during the harvest.

To account for such factors, system 100 is configured to allow the operator to perform a periodic calibration cycle wherein elevator assembly 44 is run when no sugar cane is being harvested. The measured pressure signals during this minimum load condition are stored in memory by monitor circuit 102 and the stored values are used by the yield algorithm executed by monitor circuit 102 as being representative of a no sugar cane condition. The quantity of harvested sugar cane depends upon the difference between the measured pressure signals when harvested sugar cane is being elevated and the stored calibration values which represent the pressure readings when no sugar cane is being elevated. The calibration cycle may be repeated throughout the harvesting day, at the request of the operator using input devices 116, to account for changing conditions during the course of the harvest.

For example, the operator may run the calibration cycle just before starting the harvesting day when harvesting vehicle 10 is still clean. The stored "no sugar cane" pressure sensor value will be used by monitor circuit 102 to determine the sugar cane yield for some amount of time. Then, when the operator feels that conditions affecting the load placed on elevator motor 46 by something other than the harvested sugar cane has changed (e.g., when contaminants have built up, or when temperature has changed therein effecting the viscosity of the hydraulic oil), the operator will re-run the calibration cycle and the stored "no sugar cane" value will be updated. Alternatively, the operator may simply re-run the calibration at certain time intervals during the day, or at certain events (e.g., after lunch).

Thus, monitor circuit 102 is configured to process the various input signals received from the sensors of FIG. 2 to calculate the quantity or yield of sugar cane being harvested. Monitor circuit 102 can also calibrate yield monitor system 100 to account for system changes during the harvest. Monitor circuit 102 is also configured to correlate the sensed quantity or yield data with the geographic location at which the sugar cane was harvested from field 20. The geographic location is determined based upon the positioning signals provided by positioning system 104, with offsets added to account for differences between the location of the antenna of positioning system 104 and the location in field 20 where the sugar cane was growing. When correlating the sensed quantity or yield data with the geographic location data, monitor circuit 102 can also take into account the time delay which passes between the time the sugar cane is harvested and the time at which the sensed quantity or yield data is calculated by monitor circuit 102. The correlated yield and geographic location data can be displayed on display 114, or can be stored on memory card 108 for later analysis by an external computer.

Monitor circuit 102 can also be configured to compare sensed signals from base cutter pressure sensor 35 with a predetermined threshold representative of no sugar cane stalks being cut by base cutters 34. The predetermined threshold can be determined empirically. Based upon this comparison, monitor circuit 102 can determine which areas of field 20 are barren of sugar cane. This information can be displayed on display 114. This information can also be correlated with the geographic location data from positioning system 104 to create a site-specific map indicating those areas of field 20 where no sugar cane is growing. This map can also be displayed on display 114, or can be stored on memory card 108.

Monitor circuit 102 can also be configured to employ appropriate signal processing techniques (e.g., low pass filtering) to smooth signal peaks which occur on the elevator pressure signal due to the gearing used to drive elevator assembly 44, or to smooth signal peaks which occur on the base cutter pressure signal due to the discrete nature of the sugar cane stalks being cut.

Referring to FIGS. 3–8, a second embodiment of a sensing assembly used to measure the quantity of the harvested sugar cane replaces elevator pressure sensor 48 shown in FIGS. 1 and 2. Sensing assembly 200 is located proximate to a top end of elevator assembly 44 such that a portion of sensing assembly 200 extends into discharge opening 98 where the portion is impinged by the billets as they fall down into the external storage device. Sensing assembly 200 is securely mounted to the elevator housing, or to a structural element within the elevator housing.

Referring in particular to FIG. 5, sensing assembly 200 includes a crop load sensing assembly including a deflection plate 202, a plate shaft 204, a plate lever 206, a plate load cell 208, and a plate pre-load assembly 210. Referring in particular to FIG. 6, sensing assembly 200 may further include a compensation assembly including a compensation weight 212, a weight lever 213, a compensation shaft 214, a compensation lever 216, a compensation load cell 218, and a compensation pre-load assembly 220. Each of these components is now described.

Sensing assembly 200 is mounted at the top end of elevator assembly 44 such that deflection plate 202 extends into discharge opening 98. Billets falling down into the external storage device impinge upon deflection plate 202 to exert a force on plate 202. Deflection plate 202 is rigidly attached (e.g., welded) to plate shaft 204. Plate shaft 204 is rotatably mounted to the elevator housing, or to a structural element within the housing, via ball bearing devices 222. Ball bearing devices 222 are connected to either side of the elevator housing by, for example, nut and bolt assemblies 224. Thus, when a force is exerted upon deflection plate 202 (e.g., by the falling billets, or by vibrations or bouncing which occurs when vehicle 10 moves across field 20), plate 202 exerts a torque onto plate shaft 204, which rotates with respect to the elevator housing within ball bearing devices 222.

A first end of plate lever 206 is rigidly attached to one side of plate shaft 204 by, for example, a collar 226 with a first aperture for receiving shaft 204, and a second threaded aperture leading to shaft 204 and adapted to receive a set screw 228. Thus, collar 226 is slipped onto shaft 204 and is then securely attached to shaft 204 using set screw 228. Plate lever 206 is attached to collar 226 by, for example, screwing the first end of plate lever 206 into a third threaded aperture in collar 226. A protective cover 230 can be fitted over the end of plate shaft 204.

The second end of plate lever 206 is used for transferring load to plate load cell 208 via a coupling device 232. Coupling device 232 includes a first aperture for receiving the plate lever 206 such that coupling device 232 can be slid on lever 206, a second threaded aperture for receiving a screw 234 used to securely attach device 232 to lever 206, and a protuding member 235 which passes through an aperture in the elevator housing or support structure to reach plate load cell 208. When a force is applied to deflection plate 202, torque is applied by plate 202 to plate shaft 204 and then to plate lever 206, which transfers the load to load cell 208. Force is applied to plate 202 by the billets discharged through discharge opening 98 as the billets impinge on plate 202. Thus, the electrical signal generated by cell 208, which is read by monitor circuit 102, depends upon the quantity of sugar cane billets being discharged into the external storage device. The relationship between the quantity of billets and the sensed signal read by circuit 102 can be empirically determined using appropriate curve-fitting algorithms. The algorithms account for the sensed signal component due to the constant weight of deflection plate 202.

As vehicle 10 proceeds through field 20, vibrations and bouncing will exert additional forces on deflection plate 202. To account for the effects of these dynamic forces, sensing assembly 200 may include either or both of two additional structures: plate pre-load assembly 210 and the compensation assembly 212–220. Referring in particular to FIG. 7, plate pre-load assembly 210 includes a generally U-shaped bracket 236 having a pair of flanges 238 securely attached to the elevator housing or support structure using fasteners (e.g., screws 240 or nut and bolt assemblies) or by welding. Bracket 236 is mounted such that plate lever 206 passes therethrough. Bracket 236 has a threaded aperture through which a set screw 242 can pass such that set screw 242 abuts lever 206. Thus, as set screw 242 is tightened (e.g., using hand knob 244), an increasing force is exerted upwardly against lever 206 which will be measured by plate load cell 208. Monitor circuit 102 subtracts this force from the sensed signal, in the same way that circuit 102 subtracts the force caused by the constant weight of deflection plate 202. The signal components due to the weight of plate 202, and due to the pre-loading, can be determined during calibration when there is no flow of harvested sugar cane.

The purpose of plate pre-load assembly 210 is explained in reference to the operation of sensing assembly 200. In operation, the forces exerted on plate 202 include a first force exerted by the impinging billets and a second force exerted by the weight of plate 202. When vehicle 10 is standing still, the second force is constant, and monitor circuit 102 can simply subtract off the constant portion of the sensed signal due to the weight of plate 202 to determine the portion of the sensed signal due to the impinging billets. When vehicle 10 is in motion, however, the second force is affected by the dynamic forces (e.g., vibrations and bouncing) on plate 202. When the dynamic forces are greater than the force due to the weight of plate 202, the second force will actually be exerted upwardly onto plate 202. In this situation, in the absence of pre-load assembly 210, the load being sensed by plate load sensor 208 could become "negative" and the accuracy of the sensed signal would be adversely affected. To avoid this problem, set screw 242 of pre-load assembly 210 is adjusted such that, even when vehicle 10 is moving, the load being sensed by plate load sensor 208 is always "positive". Set screw 242 is adjusted to provide a greater pre-load when vehicle 10 operates in a relatively bumpy field 20.

While pre-load assembly 210 insures that the load sensed by plate load sensor 208 is positive, the dynamic forces which occur during movement of vehicle 10 still affect the sensed signal. Monitor circuit 102 can be programmed to execute appropriate signal processing algorithms such as filters to minimize the effects of these dynamic signal components. To further minimize these effects, sensing assembly 200 can be provided with compensation assembly 212–220.

Referring in particular to FIG. 6, compensation weight 212 is sized and located to approximate the weight and center of gravity of deflection plate 202. Weight 212 includes a first aperture for slidably receiving weight lever 213 and a second threaded aperture adapted to receive a screw 246 which, when tightened, securely attaches weight 212 to lever 213. Weight lever 213 is, in turn, securely attached to compensation shaft 214 using, for example, a collar 248 having a first aperture for receiving shaft 214, and a second threaded aperture adapted to receive a set screw 250 which, when tightened, securely attaches collar 248 to shaft 214. Weight lever 213 is attached to collar 248 by, for example, screwing one end of lever 213 into a third threaded aperture in collar 248. The position of weight 212 on lever 213 is selected such that weight 212 exerts the same torque on shaft 214 as the torque exerted by only the weight of deflection plate 202 on plate shaft 204.

Referring in particular to FIG. 8, compensation shaft 214 is fitted over plate shaft 204 such that compensation shaft 214 is freely rotatably both with respect to the elevator housing and with respect to plate shaft 204. Thus, when a dynamic force is exerted upon compensation weight 212 (e.g., by vibrations or bouncing), weight 212 exerts a torque onto compensation shaft 214, which rotates with respect to both the elevator housing and with respect to plate shaft 204.

Compensation lever 216 is rigidly attached to shaft 214 by a second collar 252 which is similar to first collar 248. Collar 252 also has a first aperture for receiving shaft 214, and a second threaded aperture adapted to receive a set screw 254 which, when tightened, securely attaches collar 252 to shaft 214. Compensation lever 216 is attached to collar 252 by, for example, screwing one end of lever 216 into a third threaded aperture in collar 252.

The second end of compensation lever 216 is used for transferring load to compensation load cell 218 via a coupling device 256. Coupling device 256 includes a first aperture for receiving the compensation lever 216 such that coupling device 256 can be slid on lever 216, a second threaded aperture for receiving a screw 258 used to securely attach device 256 to lever 216, and a protuding member 259 which passes through an aperture in the elevator housing or support structure to reach compensation load cell 218. When a force is applied to compensation weight 212, torque is applied by weight 212 to compensation shaft 214 and then to lever 216, which transfers the load to load cell 218. Force is applied to weight 212 by the dynamic forces which occur when vehicle 10 moves through field 20. The electrical signal generated by compensation load cell 218 is read by monitor circuit 102. Since fluctuations which occur in this electrical signal depend entirely upon the same dynamic forces acting upon both deflection plate 202 and upon weight 212, monitor circuit 102 uses the compensation signals to cancel out the effect of the dynamic forces on the sensed signals generated by plate load cell 208.

The compensation assembly also includes compensation pre-load assembly 220 which pre-loads compensation lever 216 in the same manner that plate pre-load assembly 210 pre-loads plate lever 206, as described above.

In another embodiment of deflection plate sensing assembly 200, an inclination sensor is used rather than weight 212 to generate a compensation signal. However, the inclination sensor only compensates for static effects due to changes in the inclination of vehicle 10, and does not provide a dynamic compensation signal as vehicle 10 bounces and vibrates. The selection of the compensation structure may depend upon the extent of vehicle bouncing and vibrations.

During a harvesting operation, there are instances where vehicle 10 continues to harvest but elevator assembly 44 is stopped (e.g., during periods when the sugar cane billet cart is being emptied or replaced). During this period, billets accumulate in a hopper at the bottom of elevator assembly 44. To account for this, monitor circuit 102 "averages" the yield data for the distance that assembly 44 was stopped. To accomplish this, circuit 102 determines whether vehicle 10 is actually harvesting sugar cane or is performing another operation (e.g., turning at headlands of field 20) by monitoring the input signal from header height sensor 32. If this sensed signal indicates the height of topper assembly 22 is less than or equal to a predetermined height and the base cutter pressure signals indicate that base cutter assembly 34 is operational, circuit 102 assumes sugar cane is being harvested and continues to log the geographic locations read from positioning system 104 (even though elevator assembly 44 is stopped). When the elevator re-starts, the weight of the sugar cane that accumulated in the hopper during the time period that vehicle 10 was harvesting but elevator assembly 44 was stopped is averaged over the distance that was covered by vehicle 10 while elevator assembly 44 was stopped.

While the embodiments illustrated in the FIGS. and described above are presently preferred, it should be understood that these embodiments are offered by way of example only. Other embodiments may include, for example, sensors which include multiple deflection plates or combinations of deflection plate, torque, and hydraulic line monitors. Further embodiments may allow for monitoring the yield of other non-grain or non-bulk crops, such as potatoes, sugar beets, and other vegetables. The invention is not limited to a particular embodiment, but extends to various modifications that nevertheless fall within the scope of the appended claims.

What is claimed is:

1. On a harvesting vehicle with a harvesting mechanism including a cutting assembly for severing non-bulk crop such as sugar cane from an agricultural field and a conveyor for conveying the severed crop to a storage device, a yield monitor system for determining quantity of harvested crop, comprising:

a deflection plate sensor including a deflection plate and a load sensor coupled to the deflection plate, wherein the deflection plate is located proximate to the conveyor such that the severed non-bulk crop impinges on the deflection plate to exert a force on the deflection plate and the load sensor is configured to generate a load signal in response to the force exerted on the deflection plate; and a control monitor coupled to the deflection plate sensor, the control monitor configured to receive the load signal from the load sensor and to determine the quantity of harvested non-bulk crop therefrom, wherein the conveyor is an elevator having a crop discharge area, the deflection plate is mounted proximate to the crop discharge area, and the severed non-bulk crop impinges upon the deflection plate after discharge through the crop discharge area to fall on the deflection plate wherein the deflection plate sensor includes a shaft rotatably mounted to the elevator, the deflection plate is rigidly attached to the rotatable shaft to apply a torque to the rotatable shaft when the severed non-bulk crop impinges upon the deflection plate, and the load sensor generates the load signal in response to the torque applied to the rotatable shaft.

2. The yield monitor system of claim 1, wherein the deflection plate sensor further comprises a plate lever having a first end rigidly attached to the rotatable shaft and a second end for transferring load to the load sensor, wherein the torque applied to the shaft by the deflection plate is transferred to the load sensor.

3. The yield monitor system of claim 2, wherein the deflection plate sensor further comprises a pre-load assembly coupled to the plate lever for applying a pre-load force to the plate lever, the pre-load force also sensed by the load sensor.

4. The yield monitor system of claim 3, wherein the pre-load assembly has an adjustable element for adjusting the pre-load force applied to the plate lever.

5. The yield monitor system of claim 1, wherein the deflection plate sensor further comprises a second shaft rotatably mounted to the elevator, rotation of the first shaft being independent of rotation of the second shaft, a weight rigidly connected to the second shaft to apply a torque to the second shaft, and a second load sensor coupled to the control monitor for generating a compensation signal in response to the torque applied to the second shaft by the weight, the control monitor further configured to compensate the load signal using the compensation signal.

6. The yield monitor system of claim 5, wherein the weight is selected such that the torque applied to the second shaft by the weight is substantially equal to the torque applied to the first shaft by the deflection plate absent harvested crop.

7. The yield monitor system of claim 5, wherein the deflection plate sensor further comprises a compensation lever having a first end rigidly attached to the second shaft and a second end for transferring load to the second load sensor, wherein the torque applied to the second shaft by the weight is transferred to the second load sensor.

8. The yield monitor system of claim 7, wherein the deflection plate sensor further comprises a compensation pre-load assembly coupled to the compensation lever for applying a pre-load force to the compensation lever, the pre-load force also sensed by the second load sensor.

9. The yield monitor system of claim 8, wherein the compensation pre-load assembly has an adjustable element for adjusting the pre-load force applied to the compensation lever.

10. The yield monitor system of claim 1, wherein the control monitor is configured to utilize low pass filtering to process the sensed signal.

11. The yield monitor system of claim 1, wherein the control monitor is further configured to perform a calibration cycle to adjust for at least one of the amount and type of contaminants collected during the harvest of the sugar cane.

* * * * *